(12) United States Patent
Berger et al.

(10) Patent No.: US 6,571,613 B1
(45) Date of Patent: Jun. 3, 2003

(54) METHOD AND DEVICE FOR CONTROLLING AN INTERNAL COMBUSTION ENGINE

(75) Inventors: Joachim Berger, Winterbach (DE); Martin Hartz, Gerlingen (DE); Manfred Strohrmann, Karlsruhe (DE); Detlev Straub, Stuttgart (DE); Rene Schenk, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 09/595,675

(22) Filed: Jun. 19, 2000

(30) Foreign Application Priority Data

Jun. 17, 1999 (DE) .......................................... 199 27 674

(51) Int. Cl.$^7$ ............................................. G01M 19/00
(52) U.S. Cl. ..................................................... 73/118.2
(58) Field of Search ............................. 73/116, 118.1, 73/118.2, 117.3; 123/359

(56) References Cited

U.S. PATENT DOCUMENTS 5,235,949 A * 8/1993 Wahl et al. .................. 123/359

* cited by examiner

*Primary Examiner*—Eric S. McCall
*Assistant Examiner*—Maurice Stevens
(74) *Attorney, Agent, or Firm*—Kenyon & Kenyon

(57) ABSTRACT

A method and a device for controlling an internal combustion engine. A temperature variable and a pressure variable are detected by sensors. On the basis of at least the temperature variable and the pressure variable, a first quantity is determined that characterizes the air quantity, which is supplied to the internal combustion engine. A further sensor detects a second quantity that characterizes the air quantity, which is supplied to the internal combustion engine. The second quantity is adapted by the first quantity. Furthermore, the first quantity is used as a substitute value for the second quantity.

10 Claims, 8 Drawing Sheets

US 6,571,613 B1

METHOD AND DEVICE FOR CONTROLLING AN INTERNAL COMBUSTION ENGINE

FIELD OF THE INVENTION

The present invention relates to a method and a device for controlling an internal combustion engine.

BACKGROUND INFORMATION

A method and a device for controlling an internal combustion engine are described in U.S. Pat. No. 5,235,949 (German Patent No. 39 25 877). At least one temperature variable and one pressure variable are measured by sensors. On the basis of the temperature variable and the pressure variable, the air mass is determined that is supplied to the internal combustion engine. Alternatively, the air mass may be directly detected by a sensor.

The continuous calculation of the air mass on the basis of temperature and pressure is too slow for dynamic operation since the dynamic response of the temperature sensor is generally too low. However, a sensor detecting, for example, the air mass, may be subjected to drift or aging over the operating time. Moreover, it is possible for this sensor to fail.

SUMMARY OF THE INVENTION

An object of the present invention is to provide a method and a device for controlling an internal combustion engine that provides as accurate a signal as possible with regard to the air mass. Furthermore, it should be guaranteed that, in the case of a failure of the sensor, a substitute signal that has sufficient accuracy is available.

Using the method according to the present invention, the output signal of the air-mass meter may be corrected so that the output signal has a very high accuracy. Moreover, a substitute signal is available for the limp-home operation, for example, in the case of a failure of the air-mass meter.

DETAILED DESCRIPTION

Figure 1:
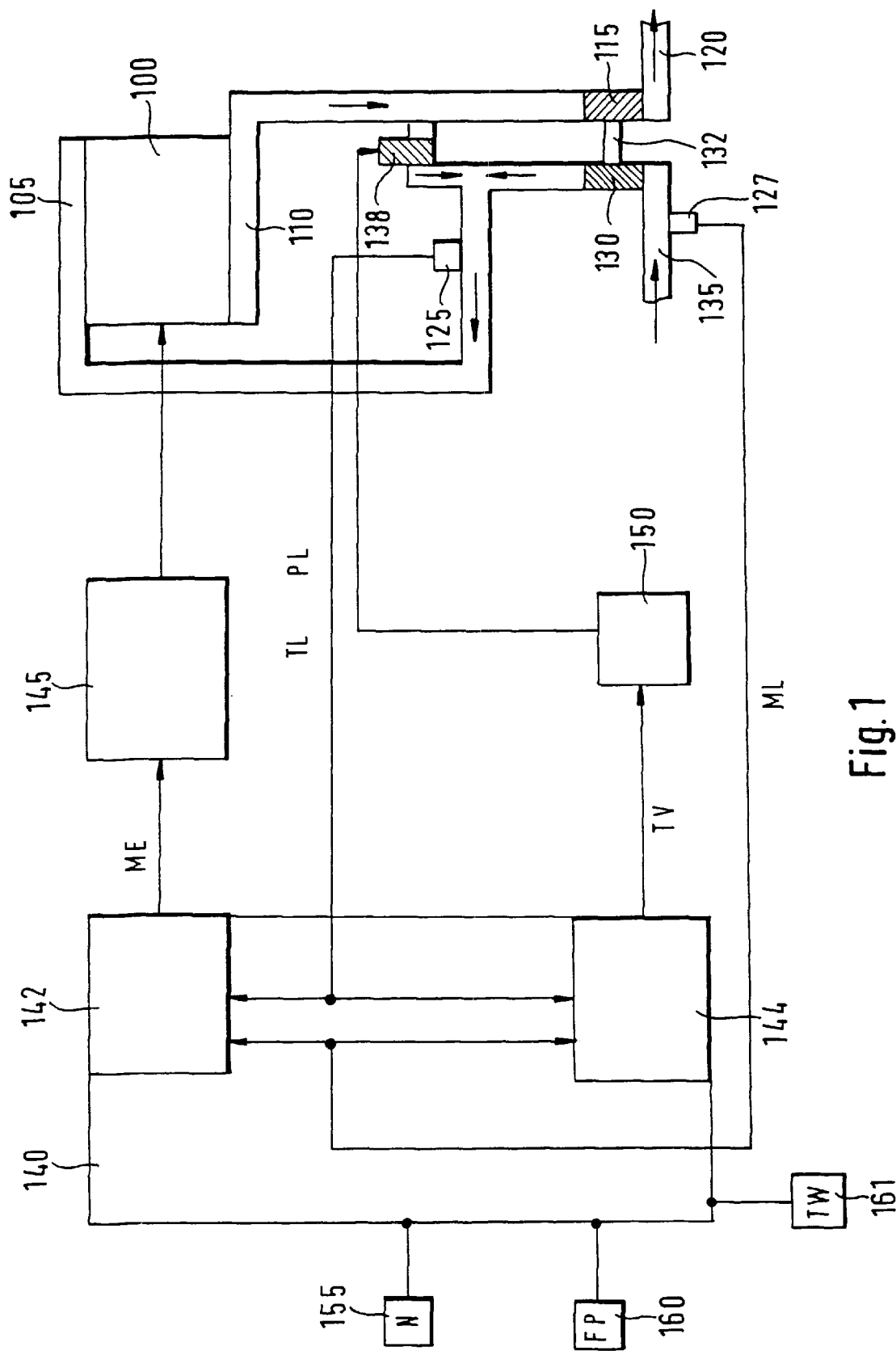
FIG. 1 shows a block diagram of a device according to the present invention.

FIG. 1 shows a schematic of a system for controlling an internal combustion engine. The depicted exemplary embodiment is a diesel internal combustion engine. However, the method according to the present invention may also be used in other types of internal combustion engines. In the following text, the method according to the present invention is described on the basis of the air mass and the fuel mass. However, the method is not limited to the processing of mass signals; it may also be used when working with quantity variables, for example when working with volume variables.

Internal combustion engine 100 is supplied with fresh air via a fresh-air pipe 105. Mounted in the fresh-air pipe are sensors 125 that provide signals TL and/or PL characterizing the temperature and/or the pressure in fresh-air pipe 105. The exhaust gas of the internal combustion engine is carried away from the internal combustion engine via an exhaust pipe 110. The exhaust gas reaches a final exhaust pipe 120 via a turbine 115.

Via a charger shaft 132, turbine 115 is linked to a compressor 130, which conveys the air flowing through intake line 135 to fresh-air pipe 105, compressing the air in the process. Mounted in intake line 135 or in fresh-air pipe 105 is a an air-mass sensor 127, which delivers a signal ML with respect to the intake-air mass. Exhaust pipe 110 and fresh-air pipe 105 are connected to each other via an exhaust-gas recirculation valve 138.

Moreover, provision is made for an electronic control unit 140 including, inter alia, a quantity control unit 142 and an exhaust-gas recirculation control unit 144. Quantity control unit 142 sends signals ME to a fuel-metering unit 145, which meters a defined fuel mass to the internal combustion engine as a function of these signals ME. Exhaust-gas control unit 144 controls an electromagnetic converter 150, which actuates exhaust-gas recirculation valve 138.

Besides signals TL, PL, and ML of sensors 125 and 127, control unit 140 receives further signals N, FP, and TW of further sensors 155, 160, and 161.

Compressor 130 compresses the air that flows in via intake line 135, and then reaches internal combustion engine 100 via fresh-air pipe 105. The exhaust gas leaving the internal combustion engine reaches turbine 115 via exhaust pipe 110 and from there final exhaust pipe 120. Turbine 115 drives compressor 130 via charger shaft 132. The composition of the air supplied to the internal combustion engine may be influenced by exhaust-gas recirculation valve 138. To this end, exhaust-gas recirculation control unit 144 issues a signal TV having a corresponding pulse duty factor to electromagnetic converter 150.

Fuel-metering unit 145 supplies internal combustion engine 100 with the fuel quantity necessary for the combustion. Control signals ME for fuel-metering unit 145 and pulse duty factor TV for electromagnetic converter 150 are input by electronic control unit 140. To this end, control unit 140 evaluates different signals.

For accurately controlling the fuel-metering unit and/or the exhaust-gas recirculation, quantity ML, which characterizes the supplied fresh-air mass, should be known as accurately as possible. In the case of a failure and/or defect of air-mass meter 127, a substitute signal having sufficient accuracy should be available. Moreover, air-mass meter 127 may be subjected to aging. This would result in that output signal ML of air-mass meter 127 is subjected to a drift. To correct this, a substitute signal is required, as well.

Therefore, according to the present invention, a first quantity MLS characterizing the air mass, which is supplied to the internal combustion engine, is determined on the basis of a temperature variable and a pressure variable. Temperature TL of the air getting into the internal combustion engine, for example, is used as a temperature variable. Pressure PL of the air getting into the internal combustion engine, for example, is used as a pressure variable.

Air mass MLS simulated in this manner is used to correct the signal of air-mass meter 127. According to the present invention, this signal was realized to provide a very accurate air-mass value in specific operating states, and is therefore suitable for adapting air-mass meter 127 in these operating states. In all operating states, air mass MLS simulated in this manner may be used as a substitute value in the case of a defect of air-mass meter 127. The accuracy of the simulated quantity is sufficient for the limp-home operation.

Figure 2:
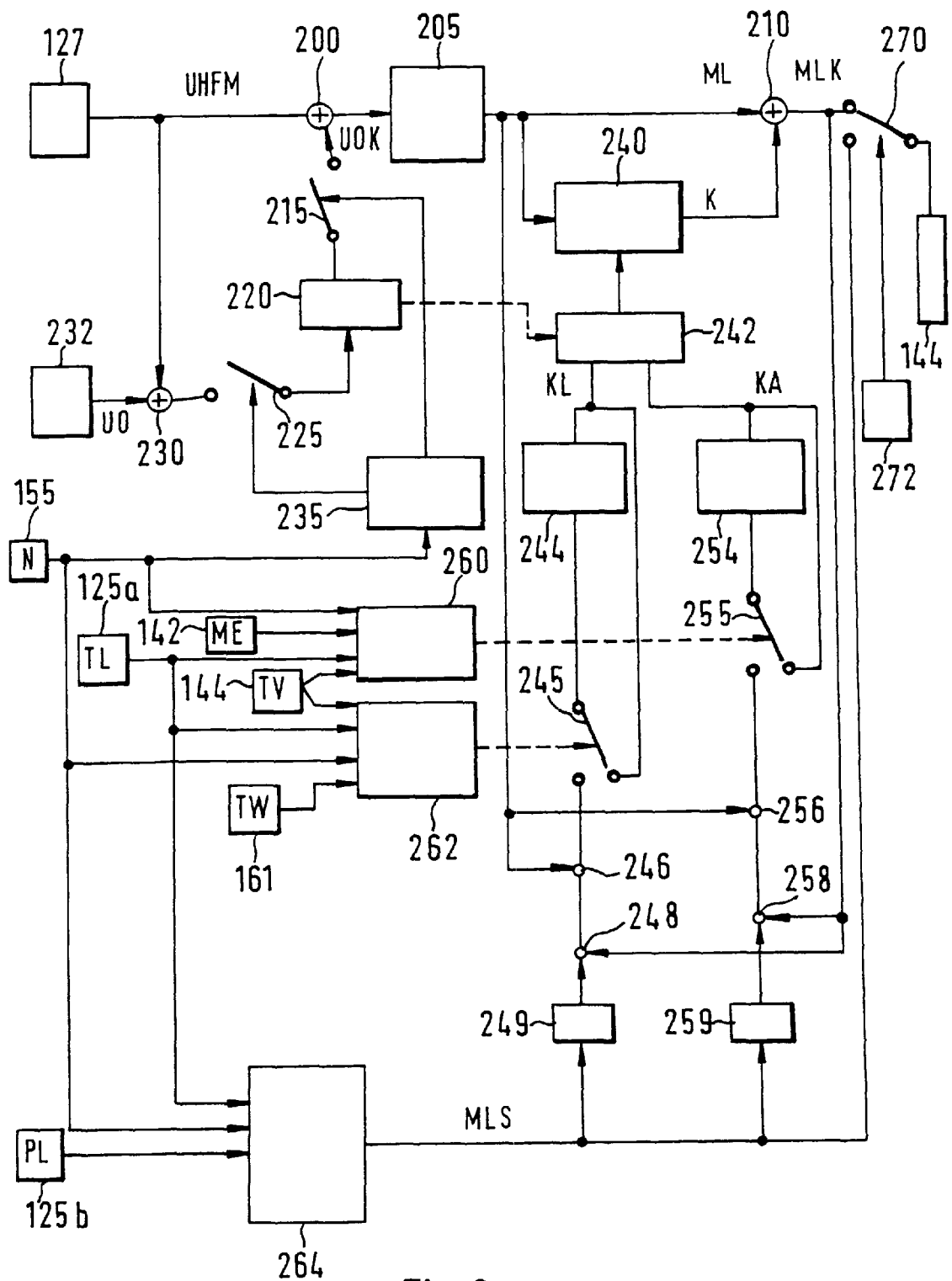
FIG. 2 shows a detailed block diagram of a determination of an air mass.

FIG. 2 depicts a block diagram of the device according to the present invention in greater detail. Elements already described in FIG. 1 are designated by corresponding reference symbols. Air-mass meter 127 delivers an output voltage UHFM to a node 200 and a node 230. From node 200, the signal reaches a characteristic curve unit 205. Stored in characteristic curve unit 205 is the interrelationship between output voltage UHFM and quantity ML, which characterizes the air mass. Output signal ML of characteristic curve unit 205, which characterizes the air mass, reaches a node 210. Output signal MLK of node 210 reaches exhaust-gas recirculation control unit 144 via a switching element 270.

At the second input of node 230, output signal U0 of a zero-value entry 232 is present. The output signal of node 230 reaches an offset detection unit 220 via a switching element 225. The output signal of offset detection unit 220 reaches the second input of node 200 via a switching element 215. A control unit 235 sends control signals to switching elements 215 and 225. Control unit 235 receives at least output signal N of speed sensor 155.

At the second input of node 210, output signal K of a correction unit 240 is present. Sent to correction unit 240 are, first, output signal ML of characteristic curve unit 205 and the output signal of an interruption unit 242. Interruption unit 242 receives output signal KL of a first low pass filter 244 and output signal KA of a second low pass filter 254.

Sent to first low pass filter 244 via a switching element 245 is alternatively an output signal of a node 246 or the output signal of first low pass filter 244. Node 246 receives, firstly, output signal ML of characteristic curve unit 205 and, secondly, an output signal of a node 248. Routed to node 248 is the output signal of a first correction unit 249 and the output signal of node 210. First correction unit 249 receives output signal MLS of an air-mass calculation unit 264.

Sent to second low pass filter 254 via a switching element 255 is alternatively an output signal of a node 256 or the output signal of second low pass filter 254. Node 256 receives, firstly, output signal ML of characteristic curve unit 205 and, secondly, an output signal of a node 258. Routed to node 258 is the output signal of a second correction unit 259 and the output signal of node 210. Second correction unit 259 receives output signal MLS of air-mass calculation unit 264.

Output signal MLS of air-mass calculation unit 264 further reaches the second switch input of switching element 270. Switching element 270 is driven by an error detection unit 272.

Air-mass calculation unit 264 receives the output signal of speed sensor 155, output signal TL of charge-air temperature sensor 125a, and output signal PL of boost-pressure sensor 125b.

Switching element 255 is driven by a first logic unit 260. Routed to first logic unit 260 are output signal N of the speed sensor, output signal ME of quantity control unit 142, charge-air temperature signal TL, and pulse duty factor TV of exhaust-gas recirculation control 144.

Switching element 245 is driven by a second logic unit 262. Routed to second logic unit 262 are output signal TW of the cooling-water temperature sensor, output signal TV of exhaust-gas recirculation control unit 144, speed signal N, and signal TL of charge-air temperature sensor 125a.

Figure 3:
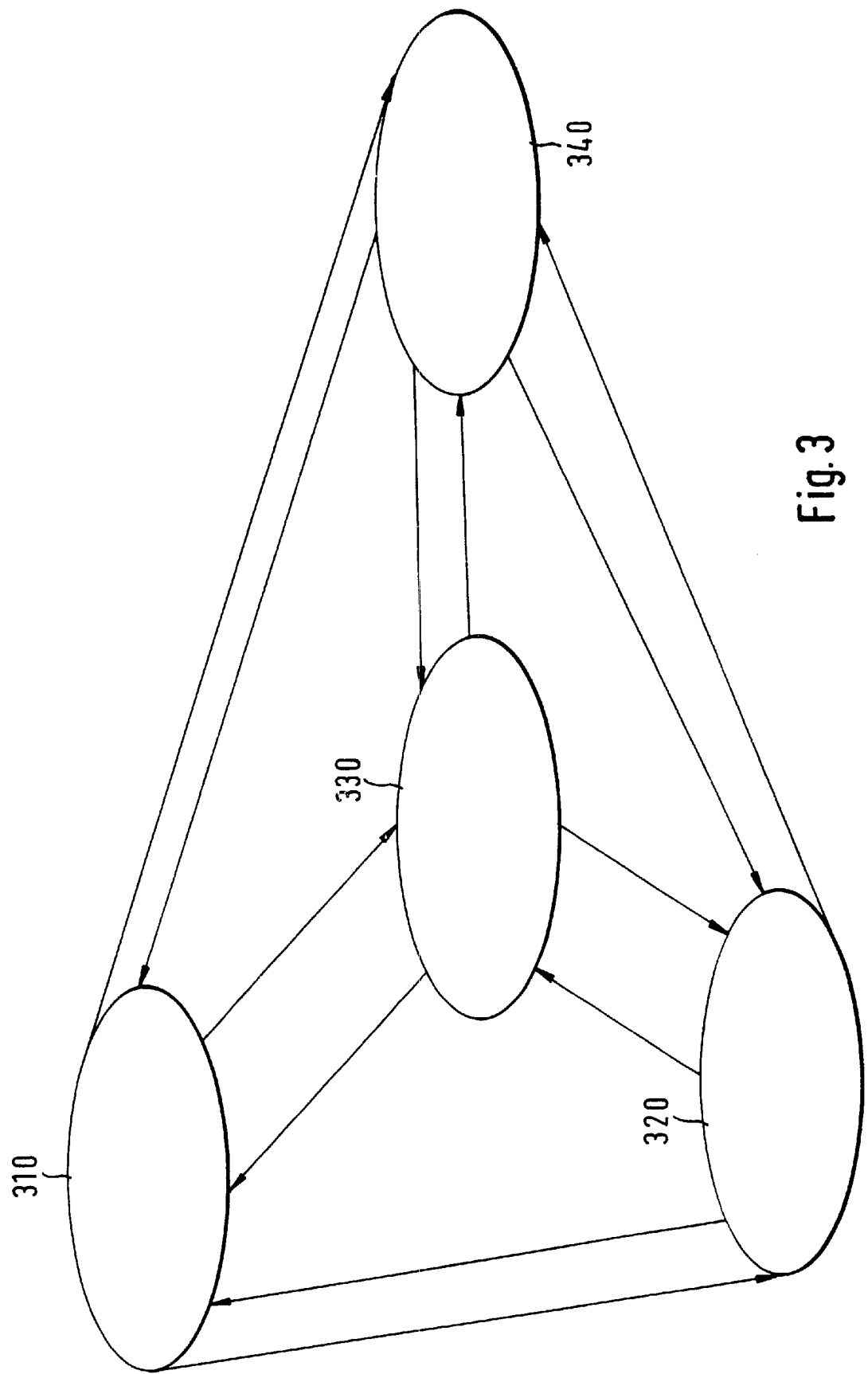
FIG. 3 shows a state diagram.

The functioning method of this device is described in the following text using FIGS. 3, 4, and 5. In characteristic curve unit 205, the interrelationship between output voltage UHFM of air-mass meter 127 and air mass ML is stored. The characteristic stored in characteristic curve unit 205 and the actual characteristic of the air-mass meter generally do not completely correspond. In this context, inter alia, an offset voltage appears that is compensated for, for example, when the internal combustion engine is at rest. To this end, the output signal of air-mass meter 127 is compared to output signal U0 of zero-value entry 232 at node 230. This difference U0K is stored in offset detection 220. During the normal operation, output voltage UHFM of air-mass meter 127 is corrected by this value U0K at node 200.

Switching element 225 is intended to express that first correction value U0K is ascertained when the internal combustion engine is at rest, i.e., when speed N assumes value 0. Switching element 215 is intended to express that, in the case of speeds greater 0, first correction value U0K is used for correcting the output signal of air-mass meter 127. This means that control unit 235 drives switching elements 215 and 225 as a function of the speed of the internal combustion engine.

This means that, when the internal combustion engine is at rest, the difference between output signal UHFM of air-mass meter 127 and expected value U0 at air mass zero is compared. When the internal combustion engine is running, output signal UHFM of the air-mass meter is corrected by this difference U0K.

According to the present invention, first correction value U0K, which is used for correcting the offset error of air-mass meter 127 in the running operation, is ascertained when the internal combustion engine is at rest. To ascertain first correction value U0K, output signal UHFM of air-mass meter 127 is compared to the zero value, which corresponds to the value of the output signal of the air-mass meter which should be present in the case of air mass zero.

Second and third corrections values are ascertained in operating states in which a thermal equilibrium between the engine temperature and the air temperature exists. This is fulfilled, for example, during the start of the internal combustion engine. Advantageously, provision may be made for the signal of boost-pressure sensor 125b to be adjusted to the signal of an atmospheric-pressure sensor.

The voltage signal of the air-mass meter corrected in this manner is converted into air-mass signal ML with the assistance of characteristic curve unit 205. At node 210, this air-mass signal ML is corrected with output signal K of correction unit 240, and then reaches exhaust-gas recirculation control unit 144 via switching element 270. Corrected air-mass signal MLK may also be sent to other functions besides the exhaust-gas recirculation control unit.

Correction value K is ascertained as follows. Corrected air-mass flow MLK is compared to a value calculated from boost pressure PL, charge-air temperature TL, and speed N. On the basis of this comparison, correction value K is then input for correcting output signal ML of characteristic curve unit 205. The calculation of the air mass from boost pressure PL, charge-air temperature TL, and speed N is, for example, carried out using the general gas equation.

The calculation of correction value K is carried out in specific operating states. These correction values K calculated in specific operating states are then used for correction in the other operating states. In specific operating states, the measured air mass is compared to the calculated air mass. On the basis of this comparison, correction values are determined that are used for correcting the air-mass signal during the running operation.

The second and third corrections values are ascertained, for example, during idle operation and/or in operating states in which no exhaust-gas recirculation takes place.

This selection of the operating states is represented by switching elements 245 and 255. First logic unit 260 and second logic unit 262 detect the operating states in which the correction values are ascertained, and then route the difference between the calculated and the measured air-mass signal to correction unit 240 via low pass filters 244 or 254, respectively.

During idle operation, the difference between measured value MLK and the calculated value for the air mass is generated at node 248. Subsequently, this difference is normalized to air-mass value ML at node 246. After that, filtering is performed by low pass filter 244. This low pass filter has a very high time constant on the order of several minutes. Consequently, a multiplicative correction factor KL ensues for the air-mass demand in the idle operation, the correction factor being related to the air-mass flow.

Second correction value KL is ascertained at idle. If the conditions for the idle operation are not fulfilled, i.e., switching element 245 is in its open condition, the existing correction value is retained, i.e., second correction value KL is constantly present at the output of the low pass filter or is stored in an appropriate storage medium.

The second correction value is ascertained during the idle operation when the following conditions exist. The difference between temperature TW of the cooling water and temperature TL of the intake air is smaller than 10°. No exhaust-gas recirculation takes place; this means that valve 138 is closed. The speed corresponds to the idle speed. The signals of boost-pressure sensor 125b and of an atmospheric-pressure sensor assume the same values.

During the operation without exhaust-gas recirculation, this means that valve 138 is closed, the difference between measured value MLK and the calculated value for the air mass is generated at nodes 258. Subsequently, this difference is normalized to air-mass value ML at node 256. After that, filtering is performed by low pass filter 254. This low pass filter has a very high time constant on the order of several minutes. Consequently, an additive correction factor KA ensues for the air-mass demand in operating states without exhaust-gas recirculation, the correction factor being related to the air-mass flow. If an exhaust-gas recirculation takes place, i.e., switching element 255 is in its open condition, the existing correction value is retained, i.e., third correction value KA is constantly present at the output of the low pass filter or is stored in an appropriate storage medium.

Third correction value KA is ascertained with the exhaust-gas recirculation switched off. Such operating states are generally present when speed N of the internal combustion engine is greater than a first threshold value S1 and smaller than a second threshold value S2. The equivalent applies to fuel mass ME to be injected.

Third correction value KA is ascertained when the following conditions are present. The exhaust-gas recirculation is switched off; this means that valve 138 is closed. The change in charge-air temperature TL is smaller than a limiting value. This means that charge-air temperature TL is nearly constant. Speed N and a signal characterizing the load are greater than a first threshold value and smaller than a second threshold value.

Corrected air mass MLK is, for example, calculated using a sectional linear interpolation. In a first range of the air mass, which are smaller than a value MLL, the first formula applies.

$$MLK=(KL*ML*ML)/MLL$$

In a second range of the air mass, which is greater than a value MLL and smaller than a value MLA, the second formula applies.

$$MLK=(KL*MLL+(KA-KL)/(MLA-MLL)*(ML-MLL)$$

In a third range of the air mass, which is greater than a value MLA, the third formula applies.

$$MLK=KA*ML$$

If interruption unit 242 detects an error in the correction, the last valid correction values are stored and the corrected air mass is calculated using these stored values. An error in the correction exists when the correction values exceed an unplausible limit.

The adaptation or the ascertainment of the correction values may assume different states. These states are depicted in FIG. 3 as state diagram. A first state 310, which is designated as state "ignition off", is defined as the internal combustion engine is switched off, i.e., the ignition switch is in its switched off position.

A second state 320 is designated as "normal operation". This state 320 is characterized in that the air mass is detected by air-mass meter 127 and corrected by correction value K. Moreover, the learning function of the correction values is active, i.e., if an operating state is detected in which correction values KL or KA may be ascertained, then this is carried out, and the new correction values are stored.

A third state 330 is designated as "offset voltage". This state is characterized in that the ignition is switched on, and the internal combustion engine is not yet running or no longer running. This means that the internal combustion engine has not yet been started, this state being designated as prerun, or that the internal combustion engine has recently been switched off, this state being designated as control-unit afterrun. In this state, the speed of the internal combustion engine assumes the value zero. In this state, first correction value U0K for compensating the offset voltage is determined.

A fourth state 340 is designated as "emergency operation" (limp-home operation). In this state, faulty correction values KL, KA, or U0K have been ascertained. This state corresponds to the normal operation to the greatest possible extent with the exception that the learning function is not active, i.e., no new correction values are stored and used. This emergency operation exists when an error in the correction has been detected. Such an error in the correction exists when value U0K for correcting the offset voltage is greater than an applicable limiting value and/or one of the two correction values KL or KA is greater than a limiting value.

In the state "ignition off", upon the preceding operation of the internal combustion engine, the detected correction values are stored so that they are available at the next start of the internal combustion engine. The storage is carried out using, for example, in an EEPROM. During initialization, for example, within the scope of service or subsequent newly installing a control unit, the correction values are set to zero.

In the second state "normal operation", the voltage measured by the air-mass meter is corrected by stored correction value U0K for compensating the offset voltage; subsequently, this corrected value is corrected by value K. When different working points are approached in which the idle condition is fulfilled or in which the exhaust-gas recirculation is shut off, corresponding correction values KL or KA are ascertained. If the magnitude of correction values KL or KA exceeds a limiting value, interruption unit 242 recognizes a failure in the correction.

In third state 330, which is designated as offset voltage, correction value U0K is ascertained by comparing the output signal of the air-mass sensor to the output signal of zero-value entry 232 while the engine is at rest and the ignition is switched on. The difference of the two values is stored if, subsequent to the measurement, the speed continues to assume the value zero.

In state 340 "emergency operation", the measured voltage of the air-mass meter is corrected by stored correction values U0K or K, respectively. Correction values KL and KA are ascertained when the corresponding operating states are reached. If the two correction values KL and KA, and voltage difference U0K are in their permissible range of values, the system recognizes the cure of the error in the correction.

In FIGS. 4a–4d, the transitions between the individual states are depicted in the form of different flow charts.

Figure 4A:
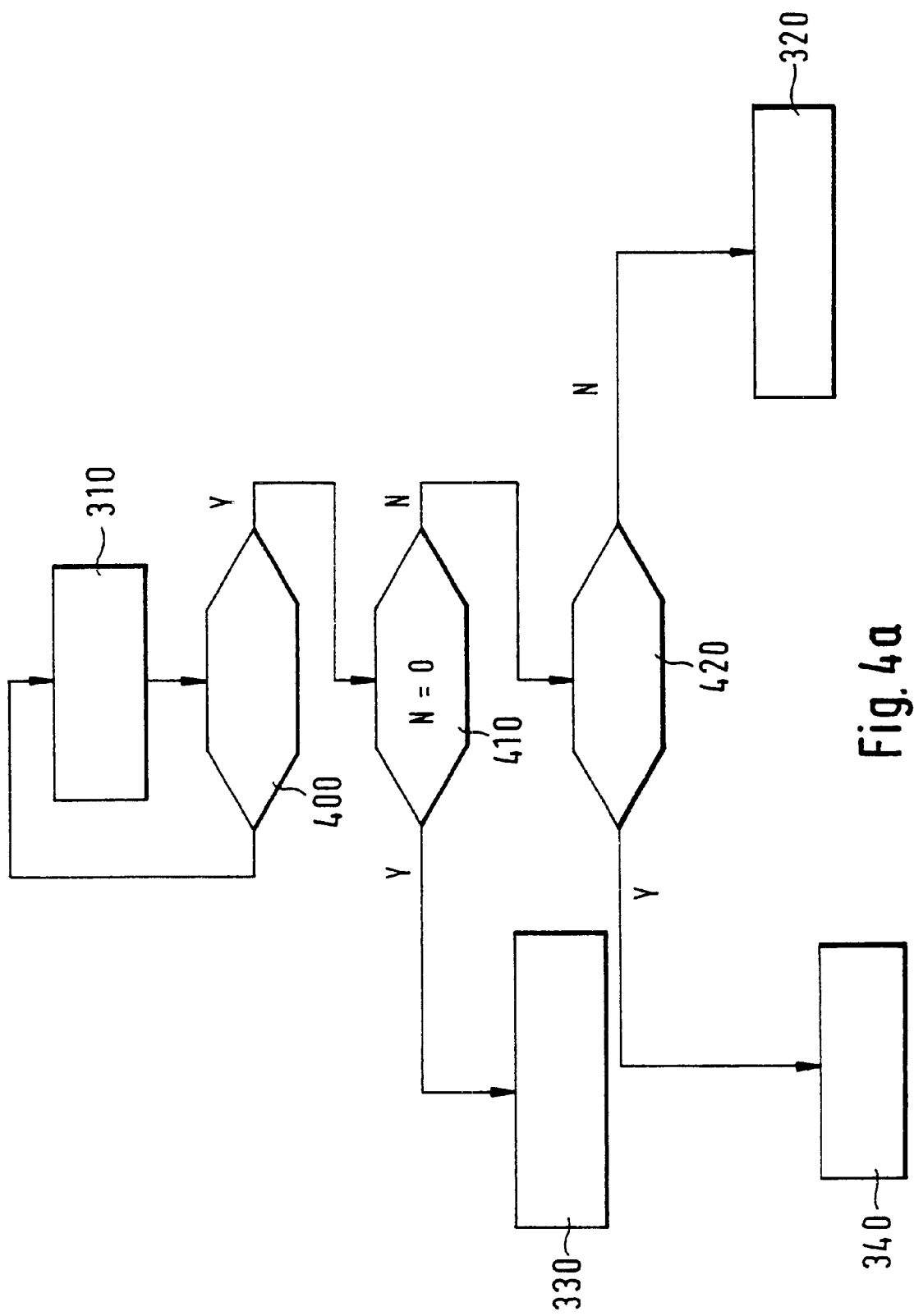
FIG. 4a shows a first flow chart of a method according to the present invention.

FIG. 4a shows the transitions starting from state 310, which is also designated as "ignition off". Interrogation step 400 checks whether the ignition switch is in its switched on position. If this is not the case, state 310 "ignition off" is continued to be detected. If interrogation 400 detects that the ignition switch is switched on, interrogation step 410 follows. Interrogation step 410 checks whether the speed assumes the value zero. If this is the case, the transition to state 330 (offset voltage) takes place. However, if interrogation step 410 detects that the speed is not equal to zero, then interrogation step 420 checks whether an error has occurred during the compensation, i.e., whether the difference of the offset voltage and the appertaining setpoint value is greater than the predefined threshold value and/or whether one of correction values KL or KA is greater than a predefinable threshold. If such an error is detected by interrogation step 420, then the transition to state 340 (emergency operation) takes place. If no error is detected by interrogation step 420, the transition to state 320 (normal operation) takes place.

This means that, if the ignition switch is in its switched on position and the speed assumes the value zero, then the offset voltage is determined in state 330. If the ignition is in its switched on state, speed N is greater than zero, and no error exists, the correction values are ascertained when the specific operating states are reached. If the ignition switch is in its switched on position, speed N is greater than zero, and an error exists in the correction value ascertainment, the correction values are indeed re-ascertained but not stored, but the last valid correction values are used for correction.

Figure 4B:
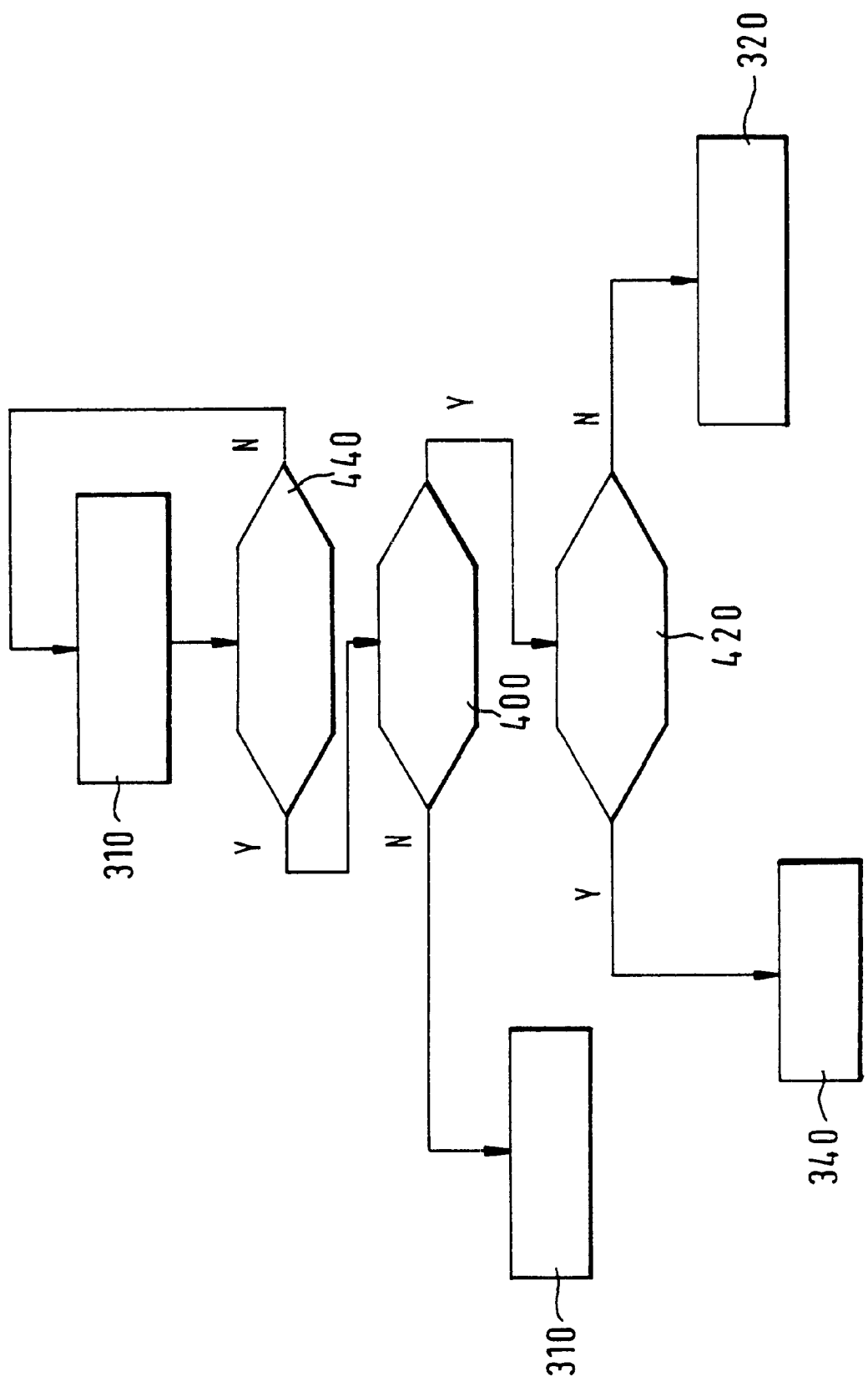
FIG. 4b shows a second flow chart of a method according to the present invention.

FIG. 4b shows transitions starting from state 330, in which the offset voltage is ascertained. Starting from step 310, in which the offset voltage is ascertained, interruption step 440 follows, in which it is checked whether correction value U0K has already been ascertained. If this is not the case, then the device remains in the ascertain-offset-voltage-state. Interrogation step 440 detects that the offset has been determined if, first of all, correction value U0K has been ascertained, and, in addition, the speed subsequently assumes the value zero, or rather as soon as the speed assumes a value greater than zero.

If interrogation step 440 detects that correction value U0K has been determined, interrogation step 400 follows, which checks whether the ignition switch is in its switched on position. If this is not the case, then state 310 (ignition off) is recognized. If interrogation step 400 detects that the ignition switch is in its switched on position, interrogation step 420 follows, which checks whether an error exists in the correction value ascertainment. If no error exists, the transition to state 320 (normal operation) takes place. If an error exists, a transition to state 340 (emergency operation) takes place.

A transition to state 310 (ignition off) takes place if correction value U0K has been determined or if the ignition switch is in its outer position. The transition to normal operation 320 takes place if correction value U0K has been determined, the ignition switch is switched on, and no error exists. The transition to operation state 340 (emergency operation) takes place if correction value U0K has been determined, the ignition switch is switched on, and an error exists.

Figure 4C:
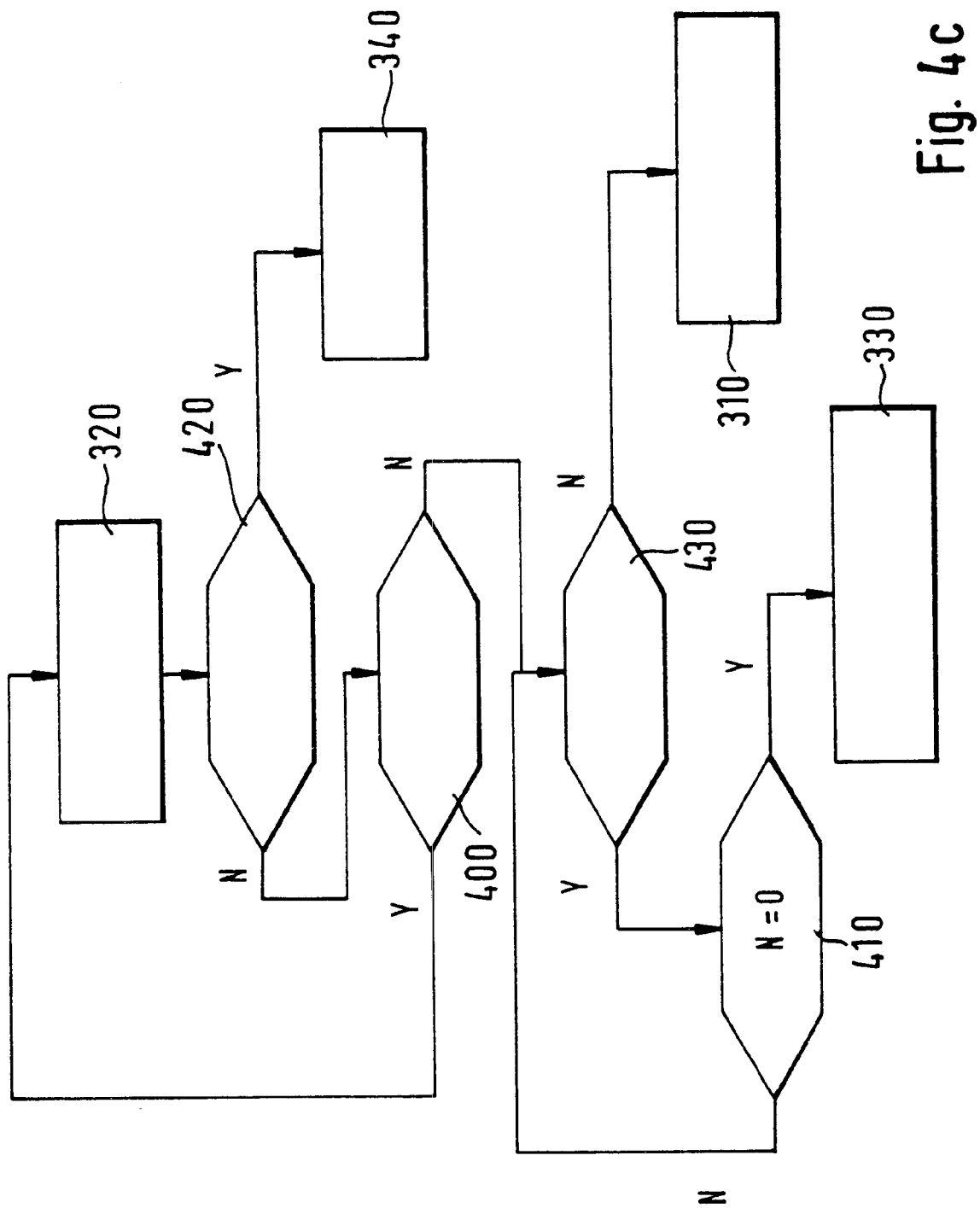
FIG. 4c shows a third flow chart of a method according to the present invention.

FIG. 4c shows the transitions starting from state 320 (normal operation). First interrogation step 420 checks whether an error exists in the correction value ascertainment. If this is the case, then the transition to state 340 (emergency operation) takes place. If this is not the case, then interrogation step 400 checks whether the ignition switch has been actuated. If this is the case, then the device remains in the state "normal operation". If the ignition switch is no longer in its switched on position, then interrogation step 430 checks whether the control unit is in its afterrun. If this is not the case, then the transition to state 310 "ignition off" takes place. If this is the case, then interrogation step 410 checks whether speed N is equal to zero. If this is not the case, then interrogation 430 is repeated. If interrogation step 410 detects the speed to be equal to zero, then the transition to state 330 takes place.

The transition to state 310 (ignition off) takes place if the ignition switch is no longer in its switched on position and no control-unit afterrun exists. The control-unit afterrun is a special state of the control unit for controlling an internal combustion engine, in which the ignition switch is switched off, but different program steps are still being processed. In the process, usually, different values are stored and/or test programs are processed.

The transition to state 330 (offset voltage) takes place if the ignition switch is no longer actuated, the speed assumes the value zero, and the control unit is in the afterrun. The transition to state 340 (emergency operation) takes place if an error in the correction value ascertainment is detected.

Figure 4D:
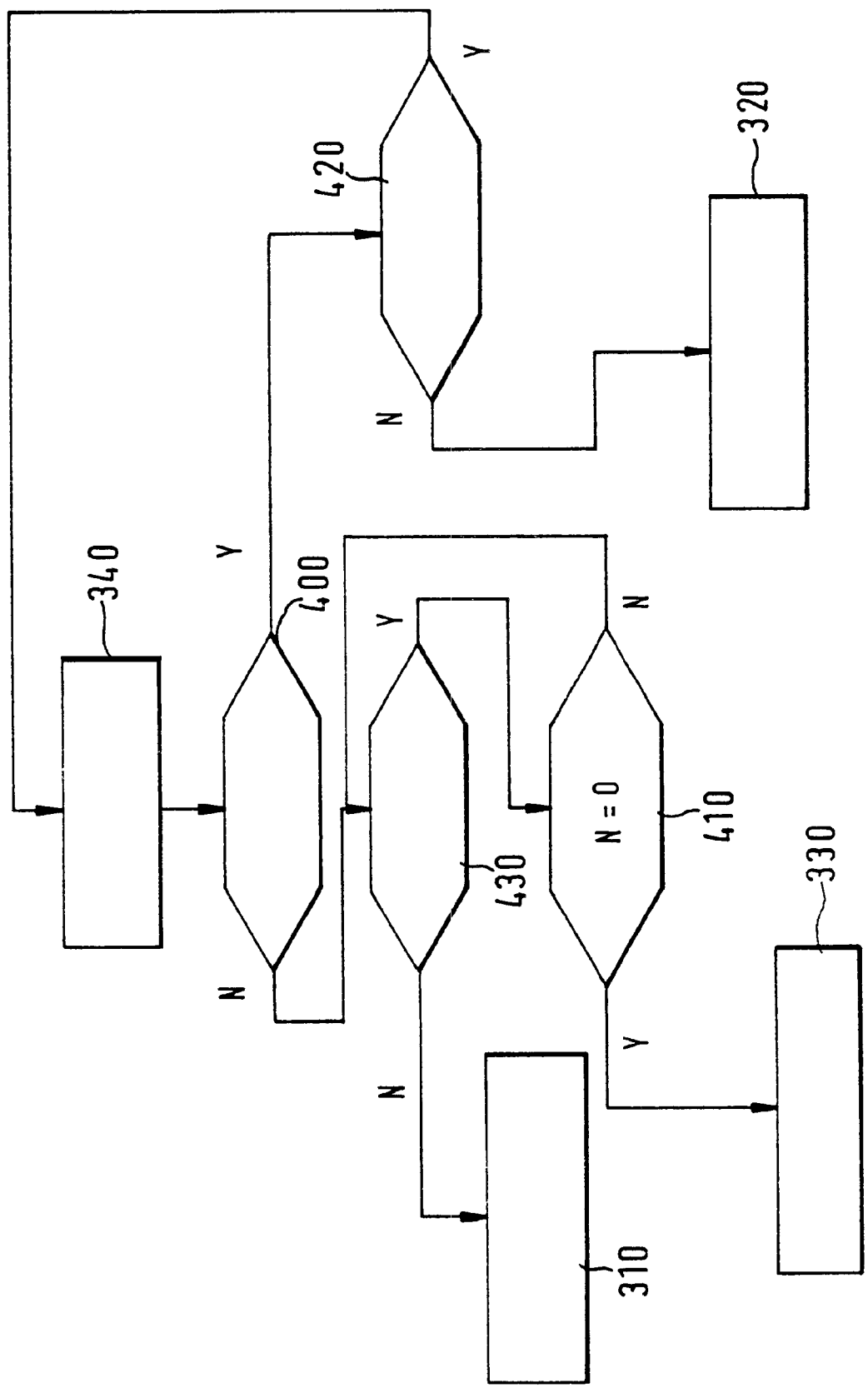
FIG. 4d shows a fourth flow chart of a method according to the present invention.

In FIG. 4d, the transitions starting from state 340 (emergency operation) are shown. A first interrogation step 400 checks whether the ignition switch is in its switched on position. If this is the case, then interrogation step 420 checks whether an error continues to exists. If this is the case, then this device remains in state 340 (emergency operation). If interrogation step 420 detects that no error exists any more, then a transition to the normal-operation-state takes place. If interrogation step 400 detects that the ignition switch is no longer in its switched on condition, then interrogation step 430 checks whether the control device is in its afterrun. If this is not the case, then the transition to state 310 (ignition off) takes place. If this is the case, then interrogation step 410 checks whether the speed assumes the value zero. If interrogation step 410 detects that the speed has assumed the value zero, then the transition to state 330 (ascertain offset voltage) takes place. If interrogation step 410 detects that the speed has not assumed the value zero, then interrogation step 430 is repeated.

The transition to state 310 (ignition off) takes place if the ignition switch is not actuated and no control-unit afterrun exists. The transition to ascertain-offset-voltage-state 330 takes place when the ignition switch is in its switched off condition, the speed has assumed the value zero, and the control unit is in the afterrun. The transition to state 320 (normal operation) takes place if no error exists any more, i.e., if correction values KL, KA, and U0K are smaller than predefinable limiting values again.

According to the present invention,. air-mass sensor 127 is adjusted, i.e., its output signal is corrected, by comparing the output signal to a reference value. This reference value is detected by other sensors. The calculation and the comparison to reference value MLS is carried out in operating states in which the reference value may be calculated from few measurable quantities in a simple and/or very accurate manner. In this context, different cases are distinguished.

Because of different effects, particularly due to impurities, the characteristic curve of the air-mass meter exhibits an offset voltage, i.e., a certain voltage is present at the output of the sensor with an air mass of zero. This offset voltage is caused particularly by impurities. To correct this offset voltage, the output signal is detected and compared to a zero-quantity value while the engine is at rest, i.e., the speed is equal to zero. On the basis of this comparison, correction value U0K is determined for correcting the offset.

A further state exists when the internal combustion engine is in idle operation. While the exhaust-gas recirculation is switched off, the air-mass flow sucked in by the internal combustion engine is calculated via the measurement of boost pressure PL and charge-air temperature TL as well as engine speed N. This calculation is performed using, for example, general gas equation.

$$ML=K*(PL*N*V)/(2*R*TL)$$

In this context, quantities R and V are constants; quantity K is the volumetric efficiency for the working point discussed.

In the case of a failure of air-mass sensor 127, the reference value, which is calculated preferably from the charge-air temperature and the boost pressure, may be used as a substitute variable. To this end, provision is made for error detection unit 272 to detect an error of air-mass sensor 127 and switch switch 270 so that the output signal of air-mass calculation 264 directly reaches block 144.

This means that, during a failure of the air-mass meter, a substitute value MLS of air mass ML is used, the substitute value being calculated on the basis of boost pressure PL, charge-air temperature TL, and/or the speed. As substitute value for charge-air temperature TL, a temperature sensor that measures the intake-air temperature may also be used.

It is advantageous for air temperature TL to be measured and subsequently be corrected as a function of the working point. The equivalent applies to boost pressure PL, which is measured and subsequently corrected as a function of the working point. By correcting the boost pressure as a function of the working point, allowance is made for speed-dependent throttle effects of the intake valves of the internal combustion engine. The charge-air temperature is corrected to compensate for the temperature difference between the measuring point in the intake section and the mean air temperature in the cylinder when the intake valves close. This correction is, for example, performed as a function of the speed and of the fuel mass.

Figure 5:
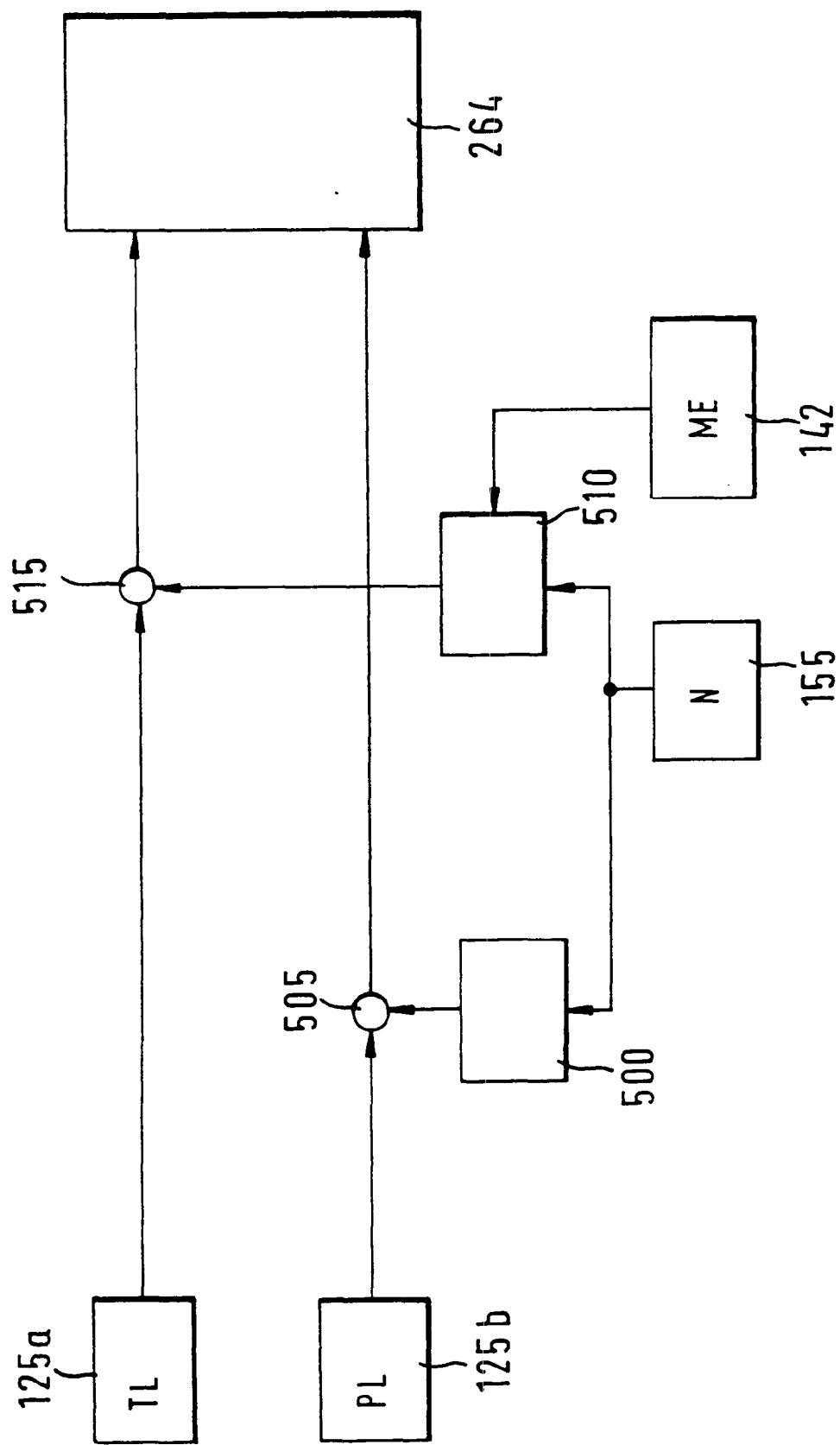
FIG. 5 shows a block diagram for providing a substitute value for the limp-home operation.

A corresponding exemplary embodiment is shown in FIG. 5. Elements described earlier are designated by corresponding reference symbols. Output signal TL of temperature sensor 125a reaches air-mass calculation unit 264 via a node 515. Present at the second input of node 515 is the output signal of a temperature correction unit 510 which receives output signal N of speed sensor 155 and fuel mass signal ME. Output signal TL of temperature sensor 125b reaches air-mass calculation unit 264 via a node 505. Present at the input of node 505 is the output signal of first correction unit 500, which receives output signal N of speed sensor 155.

At nodes 505 and 515, the output signal of sensors TL and PL are corrected, for example, additively and/or mutliplicatively as a function of the speed and of the injected fuel mass.

The value for air mass ML calculated in this manner, is used, for example, for limiting the injected fuel mass. This means that, on the basis of air mass ML, a permissible fuel mass is selected that is not exceeded during the metering in of fuel. This maximally permissible fuel mass is selected such that no soot emissions or only very low soot emissions occur.

What is claimed is:

1. A method for controlling an internal combustion engine, comprising the steps of:

measuring at least one temperature variable and at least one pressure variable using sensors;

determining a first quantity as a function of at least the at least one temperature variable and the at least one pressure variable, the first quantity characterizing an air mass supplied to the internal combustion engine;

detecting a second quantity characterizing the air mass supplied to the internal combustion engine using a further sensor; and at least one of:
adapting the second quantity using the first quantity; and
using the first quantity as a substitute value for the second quantity.

2. The method according to claim 1, further comprising the steps of:

in specific operating states, comparing the second quantity to the first quantity, the second quantity corresponding to a measured air mass, the first quantity corresponding to a calculated air mass; and on the basis of the comparison, determining correction values used in a running operation for correcting the second quantity.

3. The method according to claim 1, further comprising the step of:

while the internal combustion engine is at rest, determining a first correction value used for correcting an offset error.

4. The method according to claim 3, wherein:

the step of determining the first correction value includes the step of comparing the second quantity to a zero value.

5. The method according to claim 4, further comprising the step of:

determining at least one of a second correction value and a third correction value during at least one of an idle operation and-operating states without exhaust-gas recirculation.

6. The method according to claim 5, wherein:

at least one of the second correction value is determined during idle operation and the third correction value is determined while the exhaust-gas recirculation is switched off.

7. The method according to claim 1, further comprising the step of:

calculating the first quantity as a function of at least one of a boost pressure, a charge-air temperature, and an engine speed.

8. The method according to claim 7, wherein:

the step of calculating is performed using the general gas equation $$ML = K*(PL*N*V)/(2*R*TL)$$

where ML is the value of the air mass, K is the correction value, PL is the boost pressure, N is the engine speed, V is a constant, R is a constant and TL is the charge-air temperature.

9. The method according to claim 7, wherein:

at least one of the charge-air temperature and the boost pressure is correctable as a function of an operating state.

10. A device for controlling an internal combustion engine, comprising:

sensors detecting at least one temperature variable and at least one pressure variable;

a first device for determining a first quantity as a function of at least the at least one temperature variable and the at least one pressure variable, the first quantity characterizing an air mass supplied to the internal combustion engine;

a further sensor determining a second quantity characterizing the air mass supplied to the Internal combustion engine; and a second device for at least one of adapting the second quantity using the first quantity and using the first quantity as a substitute value for the second quantity.

* * * * *